United States Patent
Huisman (10) Patent No.: US 9,950,724 B2
(45) Date of Patent: Apr. 24, 2018

(54) CARRIAGE APPARATUS

(71) Applicant: Johan Huisman, Laniel (CA)

(72) Inventor: Johan Huisman, Laniel (CA)

( * ) Notice: Subject to any disclaimer, the term of this patent is extended or adjusted under 35 U.S.C. 154(b) by 0 days.

(21) Appl. No.: 14/934,235

(22) Filed: Nov. 6, 2015

(65) Prior Publication Data

US 2017/0129518 A1    May 11, 2017

(51) Int. Cl.
*B62B 1/14*    (2006.01)
*B62B 1/12*    (2006.01)

(52) U.S. Cl.
CPC .............. *B62B 1/14* (2013.01); *B62B 1/125* (2013.01)

(58) Field of Classification Search
CPC ......... B62B 1/14; A47F 5/103; A47B 96/061; A47B 57/42; A47B 57/425; A47B 57/56; A47B 57/022; A47B 57/40; A47B 57/406; A47B 57/16
USPC ...... 211/123, 193, 90.1, 90.2; 248/235, 241, 248/243
See application file for complete search history.

(56) References Cited

U.S. PATENT DOCUMENTS

| | | | | |
|---|---|---|---|---|
| 1,099,584 A | * | 6/1914 | Wedge | B62B 1/14 280/47.28 |
| 2,430,107 A | * | 11/1947 | Cronrath | B62B 1/14 108/107 |
| 2,814,402 A | * | 11/1957 | Schaefer | B62B 1/12 206/322 |
| 3,601,256 A | * | 8/1971 | Bowers | A47F 5/103 108/108 |
| 3,734,526 A | * | 5/1973 | Propst | B62B 3/16 213/221 |
| 3,804,432 A | * | 4/1974 | Lehrman | B62B 1/12 280/47.19 |
| 4,037,851 A | * | 7/1977 | Romero | B62B 3/02 280/79.3 |
| 4,124,185 A | * | 11/1978 | Preisinger | B62B 1/14 248/101 |
| 4,363,496 A | * | 12/1982 | Schreiner | B62B 3/10 108/152 |
| 4,403,703 A | * | 9/1983 | Nikles, Jr. | A47F 7/24 211/193 |
| 4,448,434 A | * | 5/1984 | Anderson | B62B 1/12 224/915 |
| 4,979,706 A | * | 12/1990 | Feldman | B65B 67/1227 248/101 |
| 5,160,154 A | * | 11/1992 | Seydel | B62B 1/14 280/47.19 |
| 5,464,104 A | * | 11/1995 | McArthur | A47F 5/0025 211/133.3 |
| 5,595,395 A | * | 1/1997 | Wilson | B62B 1/14 280/47.19 |
| 5,845,915 A | * | 12/1998 | Wilson | B62B 1/14 280/47.19 |

(Continued)

*Primary Examiner* — Jacob B Meyer
(74) *Attorney, Agent, or Firm* — Matthew J. Thurlow (57) ABSTRACT

Disclosed is an apparatus for use with one or more containers shaped and configured to be retained by the apparatus, the apparatus including: a lower platform extending in a substantially horizontal direction; one or more frame members attached to and extending substantially upward from the lower platform; two or more support arms detachably engaged with and extending in the substantially horizontal direction from the frame members and adapted to removably engage with and support the containers.

6 Claims, 8 Drawing Sheets

(56) References Cited

U.S. PATENT DOCUMENTS

| | | | | |
|---|---|---|---|---|
| 6,113,129 A * | 9/2000 | Marques | B62B 1/12 | 248/129 |
| 6,123,344 A * | 9/2000 | Clegg | B62B 1/14 | 211/194 |
| 6,131,926 A * | 10/2000 | Harlan | B62B 1/14 | 280/47.26 |
| 6,135,466 A * | 10/2000 | Irwin | B62B 1/12 | 280/47.19 |
| 6,382,642 B1 * | 5/2002 | Rainey | B62B 1/264 | 280/47.24 |
| 6,394,471 B1 * | 5/2002 | Watson | B62B 1/12 | 280/47.19 |
| 6,659,476 B2 * | 12/2003 | Weida | B62B 1/26 | 211/85.11 |
| 6,962,353 B1 * | 11/2005 | Garcia | B62B 1/14 | 248/215 |
| 7,066,475 B2 * | 6/2006 | Barnes | B62B 1/14 | 280/35 |
| 7,104,555 B1 * | 9/2006 | Davis | B62B 1/08 | 280/47.28 |
| 7,500,681 B2 * | 3/2009 | Steadman | B62B 1/14 | 280/47.131 |
| 7,628,406 B1 * | 12/2009 | Thomas | B62B 1/14 | 280/47.18 |
| 7,703,776 B1 * | 4/2010 | Nugent | B62B 1/14 | 280/47.18 |
| 7,815,202 B2 * | 10/2010 | Richards | A47F 5/135 | 211/126.8 |
| 7,819,407 B1 * | 10/2010 | Charitun | B62B 1/12 | 280/47.18 |
| 7,905,502 B2 * | 3/2011 | Oliver | B25H 3/00 | 280/35 |
| 7,976,033 B2 * | 7/2011 | Alves | B62B 3/027 | 280/33.998 |
| 8,104,778 B1 * | 1/2012 | Rojas | B62B 1/14 | 248/98 |
| 8,459,515 B1 * | 6/2013 | Weis | B62B 1/002 | 224/401 |
| 8,567,796 B2 * | 10/2013 | Bar-Erez | B25H 3/023 | 280/47.18 |
| 8,596,590 B2 * | 12/2013 | McCoy | F16L 3/223 | 211/193 |
| 8,640,890 B2 * | 2/2014 | Schiller | B65B 67/1227 | 211/12 |
| 8,777,024 B2 * | 7/2014 | Kramer | A47F 5/0025 | 211/187 |
| 8,844,949 B2 * | 9/2014 | White | B62B 5/067 | 280/38 |
| 8,888,112 B2 * | 11/2014 | Trapnell | B62B 1/12 | 187/244 |
| 8,936,258 B2 * | 1/2015 | Bar-Erez | B25H 3/023 | 280/47.18 |
| 8,967,633 B2 * | 3/2015 | Drowanowski | B62B 1/26 | 280/47.18 |
| 8,973,943 B1 * | 3/2015 | Gimbe | B62B 5/00 | 280/769 |
| 9,090,276 B1 * | 7/2015 | Ihrke | B62B 3/027 | |
| 9,132,543 B2 * | 9/2015 | Bar-Erez | B25H 3/023 | |
| 9,308,927 B2 * | 4/2016 | Weaver | B62B 1/264 | |
| 2005/0275178 A1 * | 12/2005 | Huesdash | A47B 57/482 | 280/47.35 |
| 2007/0063468 A1 * | 3/2007 | Hurtgam | B62B 1/12 | 280/47.24 |
| 2008/0143069 A1 * | 6/2008 | Richards | A47F 5/135 | 280/47.35 |
| 2009/0020528 A1 * | 1/2009 | Chang | A47B 47/0083 | 220/4.27 |
| 2010/0320709 A1 * | 12/2010 | Williamson | B62B 1/14 | 280/47.3 |
| 2010/0327562 A1 * | 12/2010 | Kasuya | A45C 5/14 | 280/651 |
| 2011/0049824 A1 * | 3/2011 | Bar-Erez | B25H 3/023 | 280/47.18 |
| 2012/0160886 A1 * | 6/2012 | Henny | B62B 1/14 | 224/411 |
| 2012/0280474 A1 * | 11/2012 | Murphy | B62B 1/14 | 280/659 |
| 2014/0246837 A1 * | 9/2014 | Delattre | B62B 1/14 | 280/47.19 |
| 2014/0375181 A1 * | 12/2014 | Bar-Erez | B25H 3/023 | 312/111 |
| 2015/0028554 A1 * | 1/2015 | Schneider | B62B 1/14 | 280/47.26 |
| 2015/0083679 A1 * | 3/2015 | Meers | A47F 5/0025 | 211/85.4 |
| 2016/0023349 A1 * | 1/2016 | Hoppe | A45C 7/0045 | 280/655.1 |

* cited by examiner

CARRIAGE APPARATUS

FIELD

This disclosure relates to apparatuses for supporting and carrying containers, in particular, containers of bagged groceries, pre-packaged items, loose items and/or other contents.

BACKGROUND

In any in-person shopping excursion, purchased goods, even if they are to be delivered, must be transported from the point of purchase to the desired location of the purchaser (for example, his or her home). When delivering purchases to a house, it is often a simple matter of transporting the goods in a vehicle to the home, and from the vehicle into the home, with the journey from vehicle to house being relatively small. In such instances, carrying bagged items in an overloaded and physically stressful manner, or making multiple trips, is minimally dangerous or inconvenient.

In contrast, some homes, notably condominiums or other multi-unit dwellings are located a great distance from any related parking facility. Further, the journey from vehicle to unit is often broken up into multiple segments delineated by points of controlled access. For example, there is a distance from the car to an elevator area (with a fob or key access point therebetween). There is also the elevator ride, with artificially increased downforces due to the upward acceleration and movement of the elevator. Lastly, there is at least one segment from elevator to unit, with key or fob access needed to gain entry, perhaps between each stage of the journey.

These settings do not lend themselves to easy carriage of any substantial loads. Firstly, the total distance from unit to vehicle, and the time to navigate the included barriers, renders multiple trips impractical. Secondly, the weight of the load (e.g., weekly groceries for 1-2 people) renders lengthy carriage rather physically onerous, increasing likelihood of tripping, falling, muscle, soft tissue, or other injuries. Further, as population demographics skew to the more aged, apartment and condominium populations can be expected to rise. This is because persons in this demographic may be moving from larger, family dwellings to smaller and more centrally located housing. In addition, more aged persons may require access to carrying assistance devices in even greater numbers, and with even greater ease of access, than may be the case with younger persons.

It is also increasingly common for consumers to make environmentally conscious choices including owning and reusing containers to carry groceries and the like. Many such containers are designed to themselves carry more cargo than, for example, a single plastic bag; however, this does not address the issues noted above. Indeed, if multiple such containers are needed, they can prove even more unwieldy than a plurality of plastic bags, thereby reducing any advantages of a consolidated load. This type of unwieldy carriage can increase risks of damage to various grocery or other items due to dropping, crushing or other sources of trauma leading to damage (in addition to physical risks noted above).

As such, there exists a need to provide a means of conducting purchased goods from a vehicle to a dwelling whilst minimizing strain on the carrying party, and facilitating easy transitions of such products, thereby alleviating or eliminating one or more of the aforementioned problems

SUMMARY

Herein is disclosed an apparatus for use with one or more containers shaped and configured to be retained by the apparatus, the apparatus including: a lower platform extending in a substantially horizontal direction; one or more frame members attached to and extending substantially upward from, the lower platform; two or more support arms detachably engaged with and extending in the substantially horizontal direction from the frame members and adapted to removably engage with and support the containers.

In another disclosed aspect, the apparatus is collapsible to a lesser height and volume.

In another disclosed aspect, each of the support arms has extending therefrom at least one support element shaped and configured to mate with a complementary support element on the containers.

In another disclosed aspect, the support element comprises an upwardly extending tab and the complementary support element comprises an aperture shaped to receive therethrough the tab, such that the tab may be inserted therein or removed therefrom.

In another disclosed aspect, the at least one support element comprises two support elements on each of the arms.

There is also disclosed an apparatus comprising: a lower platform extending in a substantially horizontal direction; one or more frame members attached to and extending substantially upward from the lower platform; two or more support arms detachably engaged with and extending in the substantially horizontal direction from the frame members and adapted to removably engage with and support one or more containers shaped and configured for that purpose.

In another disclosed aspect, each of the containers has an open top and a perimeter layer adjacent the top, with the complementary support elements being defined in the perimeter layer.

In another disclosed aspect, the perimeter layer comprises a lip extending outwardly substantially along a periphery of the open top of the container.

In another disclosed aspect, each of the arms has an upper edge with a scalloped portion defined therein.

In another disclosed aspect, the lower platform is hingedly connected to the frame members.

In another disclosed aspect, each of the frame members comprises a plurality of portions.

In another disclosed aspect, the portions of the frame member are provided in telescoping attachment to one another.

In another disclosed aspect, the portions of the frame member are pivotable with respect to one another.

In another disclosed aspect, the arms further comprise male members for attachment with female receptacles defined in the frame members.

In another disclosed aspect, the apparatus further comprises wheels attached to the frame members for permitting movement of the apparatus.

DETAILED DESCRIPTION

There is provided an apparatus 100 for use with one or more containers 110, specifically to retain them in a suitably secure manner to enable carriage thereof. The containers 110 are shaped and configured to be so used with or as part of the apparatus 100. The apparatus 100 includes a lower platform 102, which extends in a substantially planar manner and a substantially horizontal direction. The lower platform 102 serves as a base to allow the apparatus 100 to be free standing.

Frame members 104 are attached to and extending substantially upward and, in some embodiments, normal to the lower platform 102. Looking to FIGS. 3A and 3B, the frame members 104 may be disposed at an angle θ from the lower platform 102. This may provide added access to leverage for users.

Figure 3A:
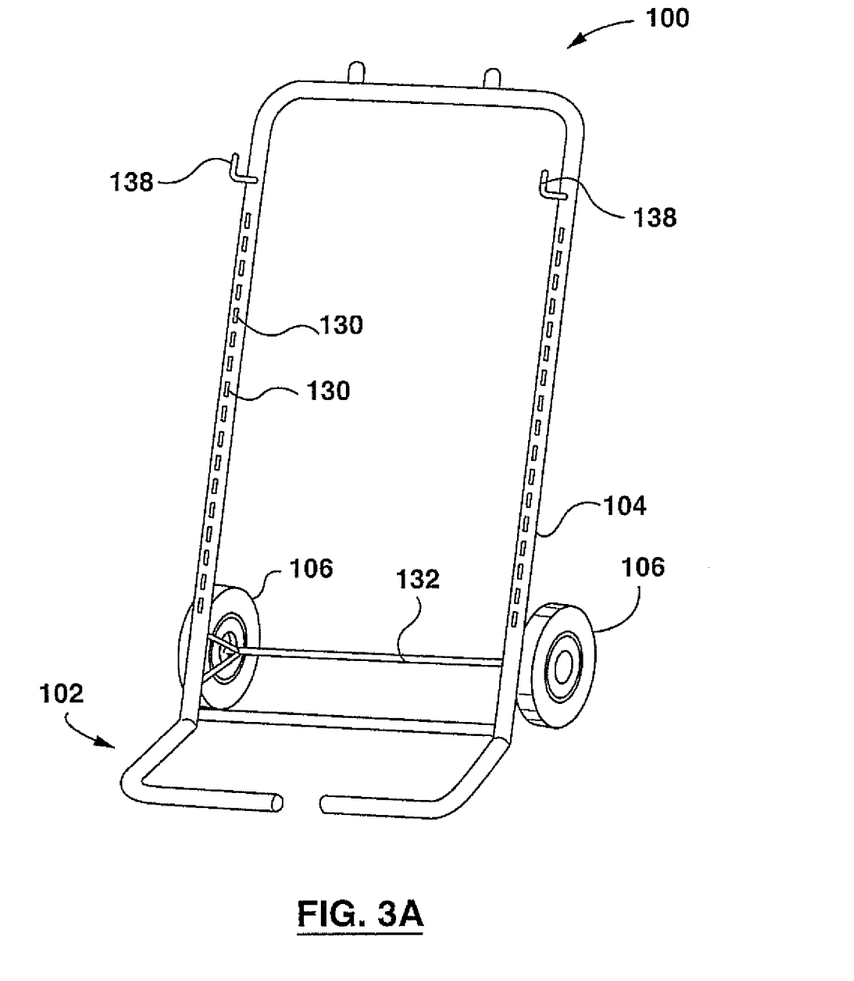
FIG. 3A is a perspective view of another embodiment of the apparatus disclosed herein.

The frame members 104 may be provided having tubular, rectangular or square cross sections, on combinations of such geometries. Two frame members 104 are shown but a different number may be provided. In some embodiments, the frame members 104 may be bolted or welded to the lower platform 102, depending on the materials used for each and whether interchangeability of ones of such components is desired. The apparatus 100 also includes wheels 106 attached to the frame members 104 for permitting movement of the apparatus 100. The wheels are typically connected by an axle 132, which may itself be housed and retained via a bracket welded to the members 104 and/or platform 102. In some embodiments, and as shown in FIG. 3, the frame members 104 may be formed integrally with the lower platform 102 (rather than necessarily being assembled by bolting, welding or the like).

Figure 5:
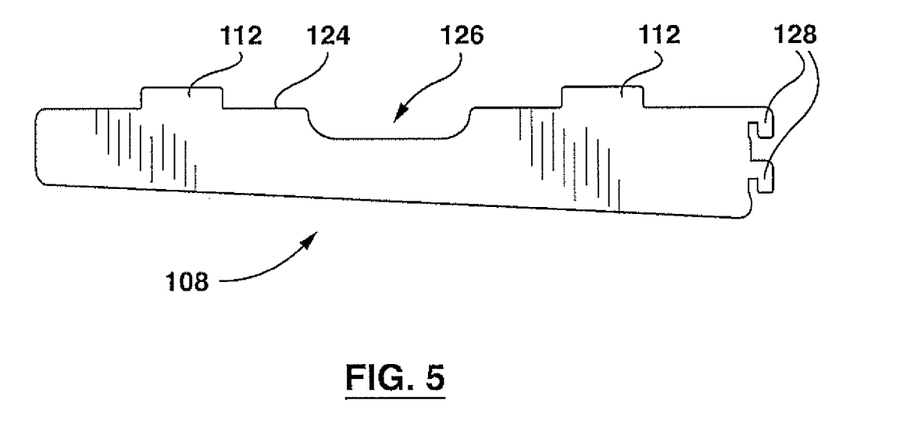
FIG. 5 is a side view of a support arm, as disclosed herein.
Figure 6:
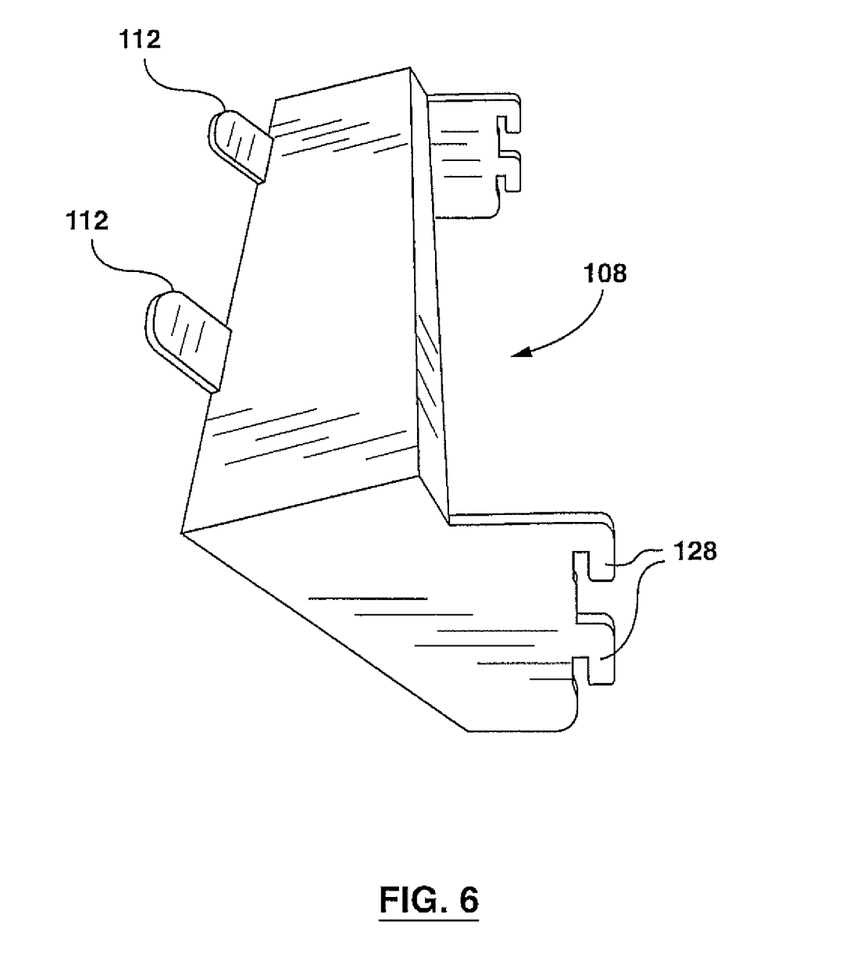
FIG. 6 is a perspective view of a support arm, as disclosed herein.
Figure 7:
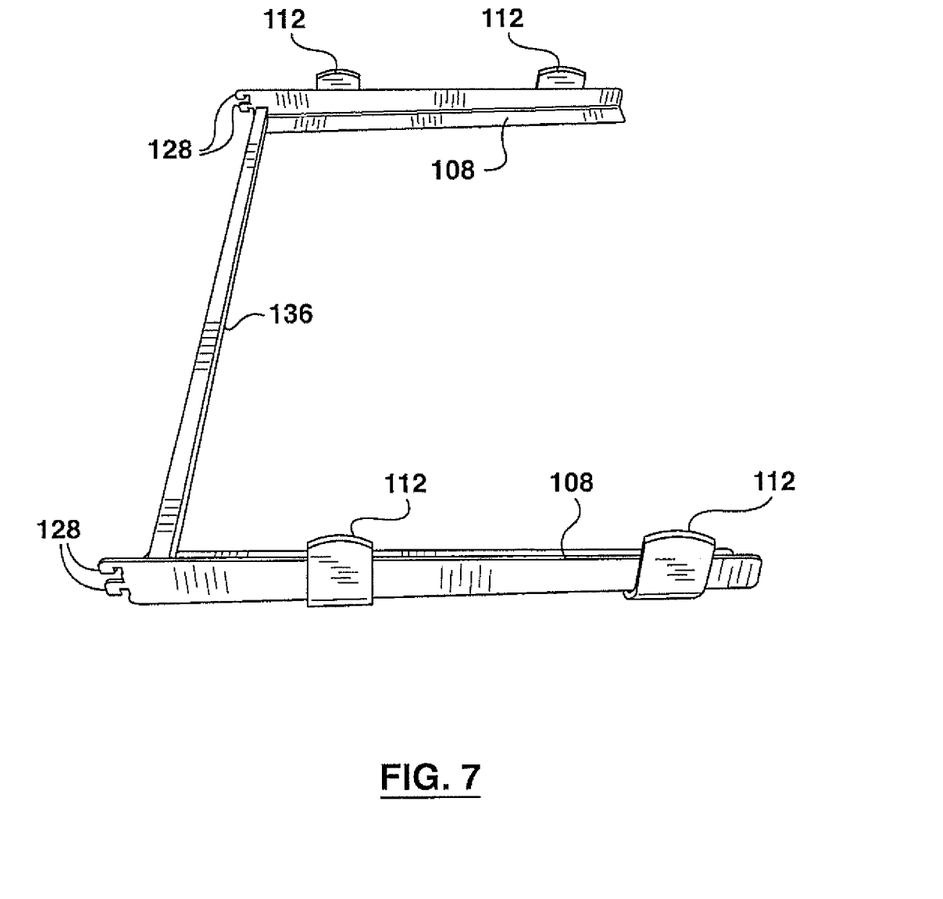
FIG. 7 is a perspective view of another support arm, as disclosed herein.

Two or more support arms 108 are detachably engaged with and extending in the substantially horizontal direction from the frame members 104. The support arms 108 may be provided as a unitary piece, for example, if connected by a cross bar 136 (for example the one shown unconnected in FIG. 1). Additional bars 136 may optionally be provided closer to the platform 102 to add support to the structure. In other embodiments, the cross bar 136 may be provided for support of the overall apparatus and not necessarily be attached to the support arms 108 (for example, being provided nearer to the lower platform so as to assist in support of heavier loads such as cases of bottled water and the like). Each support arm 108 may have multiple components, not all of which may extend solely in a horizontal direction, and such extension need not necessarily be entirely normal to the frame members 104. Various embodiments of support arm 108 are contemplated. These include, for example, those shown in each of FIGS. 5 through 7. The embodiment shown in FIG. 6 is provided in a manner so as to extend a minimal distance from the frame members 104 whilst still providing adequate leverage to support a heavy load. The embodiment shown in FIG. 7 is directed to employ lower volume support arms 108 (which may necessitate use of stronger materials so as to display the necessary strength for carriage of heavy loads). The various embodiments of support arms shown may be used in apparatuses having all support arms of the same type, or mixed to suit the hauling purposes (e.g., positioning and carrying loads of different masses, geometries, etc.).

The arms 108 are shaped, configured and adapted to removably engage with and support the containers 108. In some embodiments, the arms 108 may be provided having adjustable length, as well as alternate placements, spring loading and selective engagement. In other embodiments, such as that shown in FIG. 3B, the arms 108 may be tabs entering only a short distance from the members 104 but nonetheless added to retain the containers 110. In some such embodiments, the arms 108 may be welded to the members 104.

Figure 1:
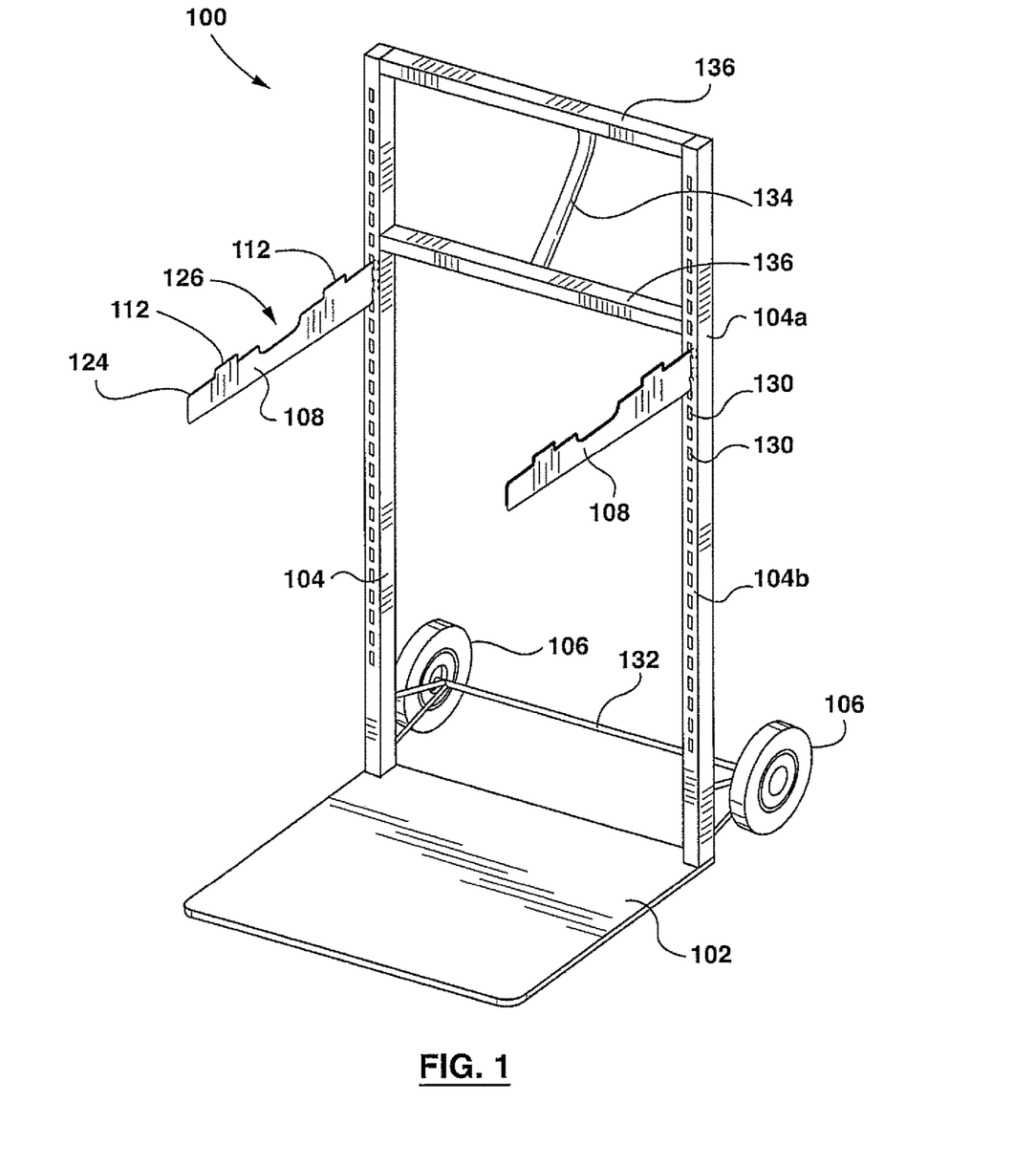
FIG. 1 is a perspective view of an apparatus disclosed herein.
Figure 2:
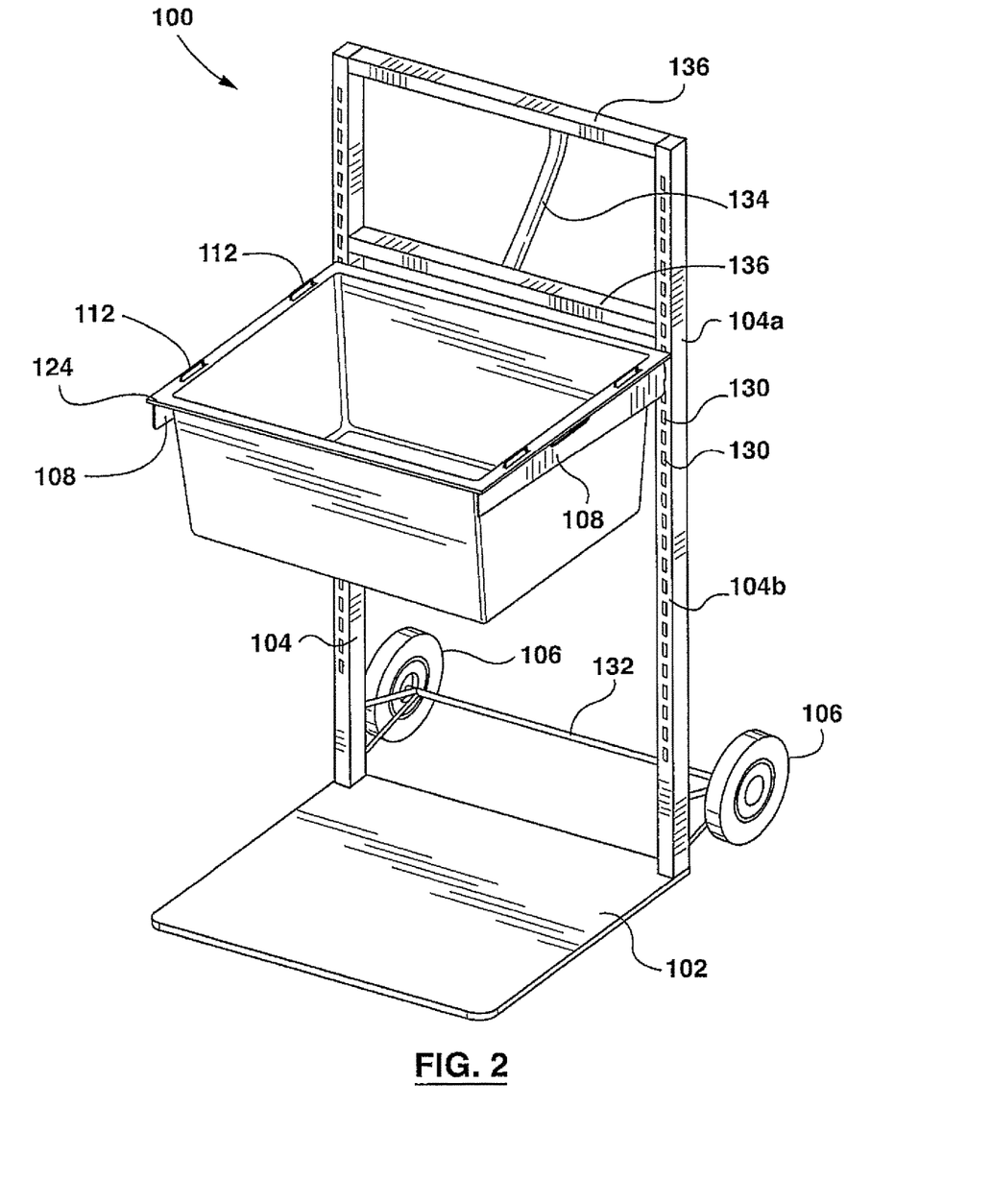
FIG. 2 is a perspective view of an embodiment of the apparatus disclosed herein.
Figure 3B:
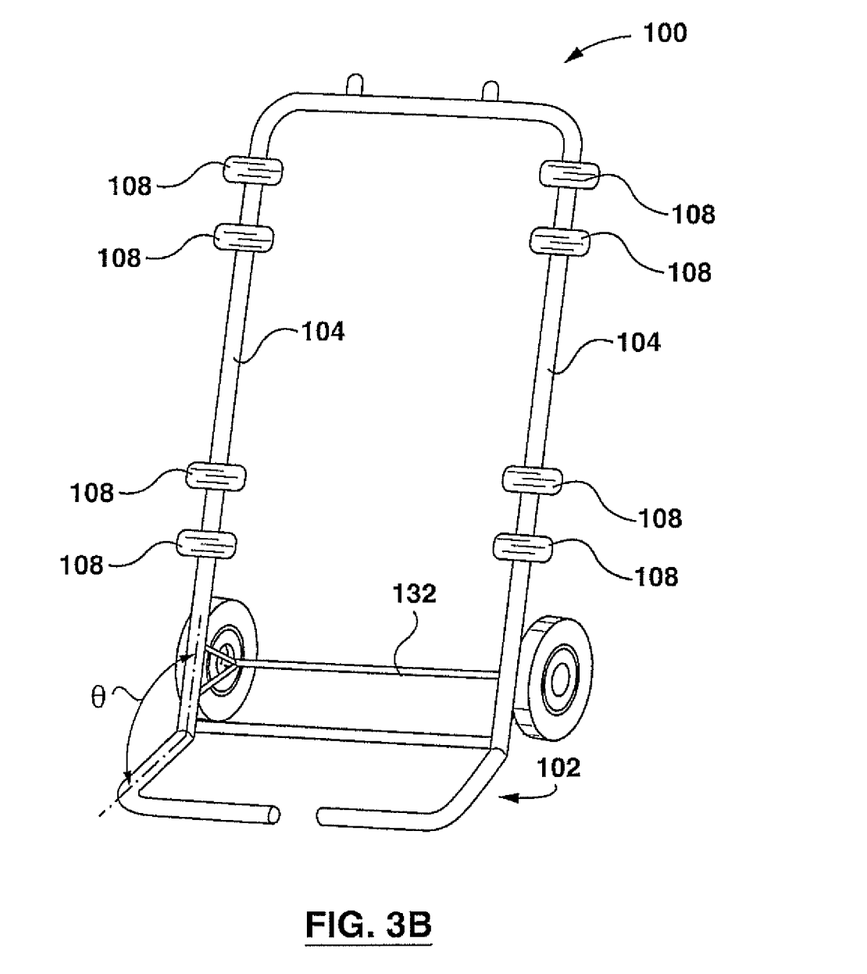
FIG. 3B is a perspective view of still another embodiment of the apparatus disclosed herein.

In some cases, the containers 110 may be retained in place by way of their mass and engagement with the support element 112, but clips, clasps or other means of further restraining the containers 110 from movement may also be provided. Each of the support arms 108 has extending therefrom at least one support element 112, shaped and configured to mate with a complementary support element 114 on the containers 110. The support element 112 may preferably comprise an upwardly extending tab 112 and the complementary support element may preferably comprise an aperture 114 shaped to receive therethrough the tab 112, such that the tab 112 may be inserted therein or removed therefrom. The at least one support element 112 may preferably comprises two support elements 112 on each of the arms 108 as shown in FIGS. 1-3. The shaping, positioning, number and size of such support elements 112 may also be variable to facilitate use with containers 110 having different orientations and shaping, without using differing other apparatus 100 elements. The shape and number of support elements 112 may vary from application to application depending on similar factors.

The apparatus 100 may, in some embodiments, be collapsible to a lesser height and volume. Such collapsibility may include providing the lower platform 102 in hingeable connection to the frame members 104. Further, the frame members 104 may each include a plurality of portions 104a, 104b, with such portions being provided as telescoping with one another or pivotable, to facilitate diminution of effective size and volume. This aids with, for example, ease of transporting the apparatus in a vehicle in an unobtrusive manner, and well as efficient storage of the apparatus. Embodiments are also provided wherein the frame members 104 engage the platform 102 in the manner shown in FIGS. 3A and 3B. This includes wherein the members 104 and the platform are integrally formed, rather than being attached to one another. The fame members 104 may also be provided with slits 130 such as those shown in FIG. 3A. Again, in some embodiments, the members 104 may be disposed at an angle θ relative to the platform 102.

Materials choices may be made so as to minimize weight of the apparatus whilst maintaining necessary strength. Suitable choices in some embodiments (none necessarily for the entirety of the apparatus 100; indeed, containers 110 will, in most embodiments, be plastic) include aluminum, steel and composite materials.

Each of the containers 110 may be provided with an open top 120 and a perimeter layer 122 adjacent the top 120, with the complementary support elements 114 being defined in the perimeter layer 122. The perimeter layer 122 may comprises a lip 122 extending outwardly, substantially along a periphery of the open top 120 of the container 110.

Each of the arms 108 may be provided having an upper edge 124, with that edge 124 having a scalloped portion 126 defined therein. In embodiments having this feature, the scalloped portion 126 provides for a space between container 110 and arm 108 which facilitates handling of containers 110 without injuring and/or impacting the user's fingers. As will be apparent from a review of FIGS. 5 through 7, not all embodiments will feature the scalloped portions 126.

Figure 4:
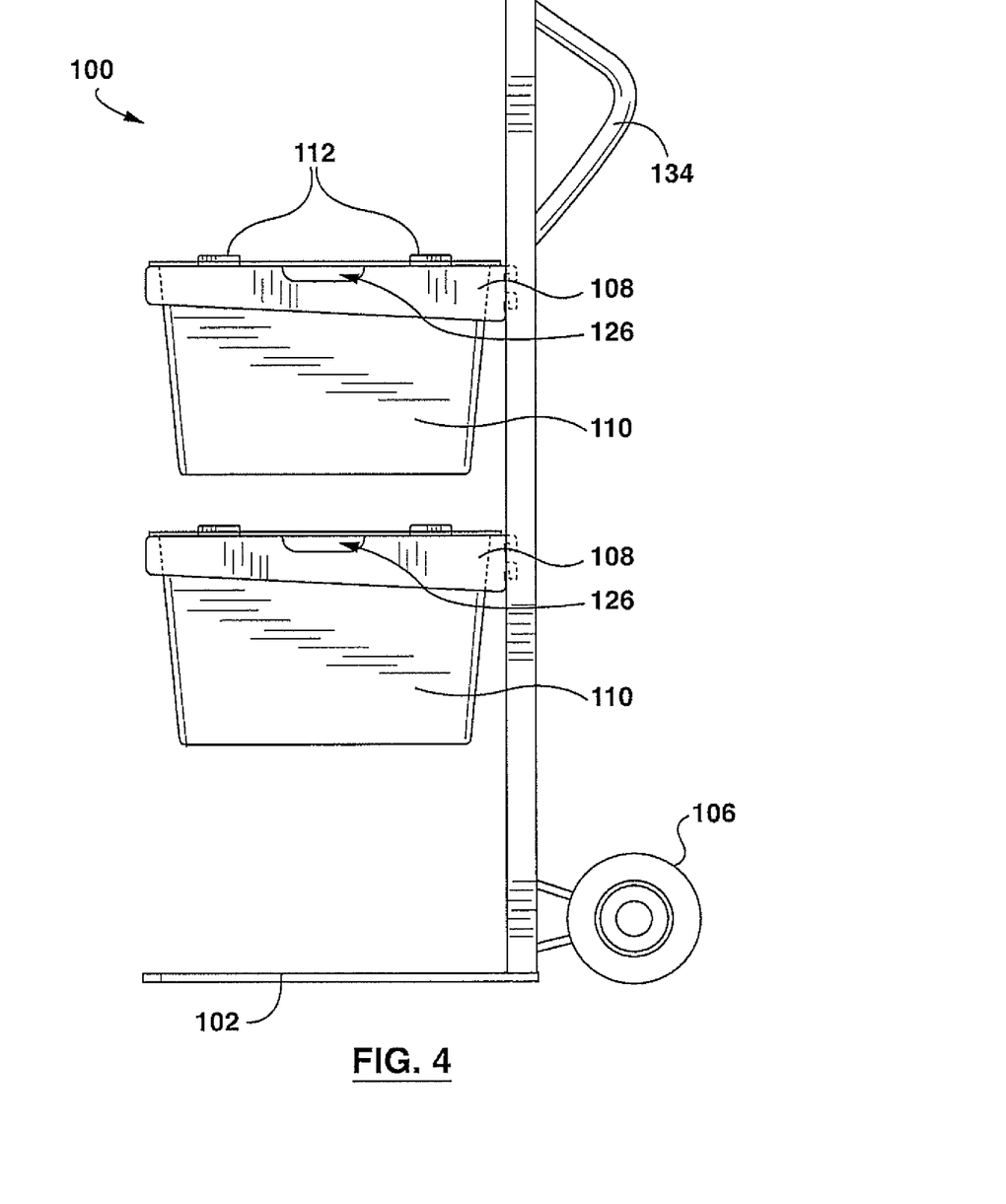
FIG. 4 is side view of yet another embodiment of the apparatus disclosed herein.

The arms may include male members 128 (best shown in FIGS. 5 through 7) for attachment with female receptacles 130 defined in the frame members 104. This is but one possible configuration, as one skilled in the art will appreciate that the arms 108 may be attached by way of bolt, clamp or other means (e.g., welding). Further, other embodiments of members and receptacles are within the score herein disclosed. Providing the male members 128 and receptacles 130 in the manner shown facilitates movement of the arms 108 to accommodate different numbers and sizes of containers 110 (e.g., two containers in FIG. 4, one in FIG. 2)

In some embodiments, there may also be provided hooks 138 (see FIG. 3A) or other retention members to allow users to hang purses, bags, clothing therefrom to facilitate use of the apparatus 100.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided as organizational cues. These headings shall not limit or characterize the invention(s) set out in any claims that may issue from this disclosure. Specifically and by way of example, although the headings refer to a "Field," such claims should not be limited by the language under this heading to describe the so-called technical field. Further, a description of technology in the "Background" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

All of the apparatuses disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

The invention claimed is:

1. An apparatus comprising:
a lower platform extending in a substantially horizontal direction;
one or more frame members attached to and extending substantially upward from the lower platform;
two or more support arms detachably engaged with and extending in the substantially horizontal direction from the frame members and adapted to removably engage with and support one or more containers shaped and configured for removeable engagement therewith;
wherein each of the support arms has extending therefrom two support elements;
wherein each of the support elements comprises a tab extending substantially upwardly from a respective one of the support arms and is shaped and configured to mate with a respective complementary support element wherein each complementary support element comprises an aperture defined on the containers and is shaped and configured to receive therein a respective one of the tabs.

2. The apparatus according to claim 1, wherein each of the containers has an open top and a perimeter layer adjacent the top, with the complementary support elements being defined in the perimeter layer.

3. The apparatus according to claim 2, wherein the perimeter layer comprises a lip extending outwardly substantially along a periphery of the open top of the container.

4. The apparatus according to claim 1, wherein the each of the arms has an upper edge with a scalloped portion defined therein.

5. The apparatus according to claim 1, wherein the arms comprise male members for attachment with female receptacles defined in the frame members.

6. The apparatus according to claim 1, further comprising wheels attached to the frame members for permitting movement of the apparatus.

\* \* \* \* \*